(12) United States Patent
Smith et al.

(10) Patent No.: US 12,580,375 B2
(45) Date of Patent: Mar. 17, 2026

(54) RETRACTABLE CABLE REEL FOR TORSION-SENSITIVE CABLE

(71) Applicants: V. Roland Smith, Spanish Fork, UT (US); Jessica Rose Smith, Spanish Fork, UT (US)

(72) Inventors: V. Roland Smith, Spanish Fork, UT (US); Jessica Rose Smith, Spanish Fork, UT (US)

( * ) Notice: Subject to any disclaimer, the term of this patent is extended or adjusted under 35 U.S.C. 154(b) by 378 days.

(21) Appl. No.: 18/177,116

(22) Filed: Mar. 2, 2023

(65) Prior Publication Data

US 2024/0297489 A1     Sep. 5, 2024

(51) Int. Cl.
*H02G 11/02*      (2006.01)
*G02B 6/44*       (2006.01)
*H02G 11/00*      (2006.01)

(52) U.S. Cl.
CPC ........... *H02G 11/02* (2013.01); *G02B 6/4457* (2013.01); *H02G 11/003* (2013.01)

(58) Field of Classification Search
CPC ..... H02G 11/02; H02G 11/003; G02B 6/4457
See application file for complete search history.

(56) References Cited

U.S. PATENT DOCUMENTS

| | | | |
|---|---|---|---|
| 1,276,825 A | 8/1918 | Swope | |
| 1,446,410 A | 2/1923 | Bennett et al. | |
| 3,018,980 A | 1/1962 | Goertz et al. | |

| | | | |
|---|---|---|---|
| 3,061,234 A | * 10/1962 | Morey | B65H 75/4449 242/378.2 |
| 3,146,967 A | 9/1964 | Bowman | |
| 3,374,319 A | 3/1968 | Stahmer | |
| 3,409,246 A | 11/1968 | De Pas | |
| 3,430,179 A | 2/1969 | Shoji | |
| 3,599,165 A | 8/1971 | Wendell et al. | |
| 3,657,491 A | 4/1972 | Ryder et al. | |
| 3,695,544 A | 10/1972 | Morey, Sr. | |
| 3,959,608 A | 5/1976 | Finlayson et al. | |
| 4,008,791 A | * 2/1977 | Shafii-Kahany | B66F 9/205 242/378.2 |
| 4,010,913 A | * 3/1977 | Guerster | B65H 75/38 242/378.1 |
| 4,584,442 A | 4/1986 | Shields et al. | |
| 4,690,498 A | * 9/1987 | Priaroggia | G02B 6/4434 385/101 |
| 4,722,589 A | * 2/1988 | Priaroggia | G02B 6/4434 385/101 |
| 5,022,600 A | * 6/1991 | Blanc | B65H 75/38 242/378.2 |
| 5,094,396 A | 3/1992 | Burke | |

(Continued)

*Primary Examiner* — Vanessa Girardi

(57)     ABSTRACT

A cable reel is disclosed having an outer deployment spool for deployment and retractive coiling of cable based on rotation about a central axis. The cable reel also has an inner, coaxial drum in which stored cable assumes tighter loops and relaxed loops responsive to the deployment or coiling of the cable on the outer spool. The cable extends from the inner drum through an opening in an axial tube and out of the drum orthogonally. The cable is contiguous from the deployable end on the outer spool, through the inner drum coils and through the axial tube. The reel may have a resistive spring or other means of retraction. The disclosed cable is not subject to acute bends, turns or torsion upon its long axis through deployed and retracted phases.

6 Claims, 6 Drawing Sheets

(56) References Cited

U.S. PATENT DOCUMENTS

| | | | |
|---|---|---|---|
| 5,176,331 A | 1/1993 | Horne | |
| 5,655,726 A | 8/1997 | Peterson et al. | |
| 6,282,289 B1 | 8/2001 | James et al. | |
| 6,416,005 B1 | 7/2002 | Liao | |
| 6,616,080 B1 * | 9/2003 | Edwards | A45F 5/004 |
| | | | 242/378.1 |
| 6,726,140 B2 | 4/2004 | Wivagg | |
| 7,389,955 B2 * | 6/2008 | Liao | B65H 75/4431 |
| | | | 242/378.1 |
| 7,472,858 B2 | 1/2009 | Gallego et al. | |
| 8,235,322 B1 * | 8/2012 | Zalitzky | G02B 6/4457 |
| | | | 242/378.2 |
| 8,727,084 B1 * | 5/2014 | Kuker | B65H 75/425 |
| | | | 242/378.2 |
| 8,837,940 B2 | 9/2014 | Smith et al. | |
| 10,087,040 B2 | 10/2018 | Morey | |
| 2014/0062806 A1 | 3/2014 | Higby | |
| 2014/0299704 A1 | 10/2014 | Hallowed | |
| 2015/0325996 A1 | 11/2015 | Ciampa et al. | |
| 2017/0110220 A1 * | 4/2017 | Romer | E21B 43/128 |

* cited by examiner

RETRACTABLE CABLE REEL FOR TORSION-SENSITIVE CABLE

FIELD OF THE INVENTION

The present disclosure generally relates to cable reels for carriage and deployment of cables. More particularly, the disclosure relates to cable reels for management of cables that are used to convey fluids, solids, electric power and data signals. Yet more particularly, many of the means presently used to convey more sophisticated substance across complex environments have attribute requirements that have not been addressed by any existing cable reel configuration.

BACKGROUND

Elongate conveyance structures have long been understood to be desirable. For example, Roman aqueducts are admired for bringing water to one of the World's first great cities. The electric age brought the need to convey electric current to a panoply of devices having such electric demand. Distance from electric sources and mobility of the devices themselves, created a need for temporary storage of electric wires. This need has been generally met by the use of cable reels.

Exemplary of this is the invention described in U.S. Pat. No. 1,446,410, to Bennett, et. al. styled "Winding Reel" (the '410 Patent). The "winding reel" of the '410 Patent is described to wind the "intermediate portion of a [cable] to shorten the length . . . without disturbing fluid flow" to, in this example, a telephone.

The primary problem with early cable reels is that one cannot reel a cable without creating twists and turns in the cable itself. Any conductor of the sorts described has two ends. Though, not always the case, there is generally a source end and a free end. The free end is normally considered more mobile than the source-end. Given this reality, the cable reel is often situated proximal to the source.

So, typically, the reel creates coils in its free end and twists in its source end. This can be easily be dealt with, under typical circumstances by providing a detachable connector at the source end. When a length of cable is deployed to the free end, the plug is first detached, the cable deployed, then the plug reattached. The process would be repeated in reverse order for reeling or coiling the cable after use.

In practical use, however, the unplug, deploy, plug sequence is often not practicable. Specifically, when a call came in on a telephone (e.g. the '410 Patent), the impracticability is manifest. The '410 Patent deals with this by arranging a slack reel to counterbalance the twisting effect of deploying the cable.

Other structural means were developed to address the problems with cable reels, such as the slip ring of U.S. Pat. No. 3,430,179 to Shoji (the '179 Patent). Slip rings are well known in the art and widely described to maintain constant connections on cable reels. In fact, slip rings of all sorts and descriptions have been state of the art for much of the past century.

Slip rings are limited in that they are often restricted to transmitting power or basic data. They are also limited in their ability to handle harsh environments; ingress of dirt and corrosion can cause serious problems. As a dynamic contact joint, slip rings are subject to wear and friction; further they can cause electrical arcing which limits their use in areas with explosion or fire hazards. New demands for sensitive and high-speed data also present limitations to slip rings, which are subject to variance in signal impedance, timing issues and other variances resulting in signal degradation.

Fiber optic wave guides are brittle and very sensitive to excessive bending and torsion. Fiber optic rotary joints are known in the art; however, they are generally complex and may result in signal degradation. Other methods may exist to provide rotational capability to fiber optics, such as conversion to an electrical signal and then transmission through a slip ring, generally these methods reduce transmission integrity and data speed.

Solid material carriers such as welding wire and solder wire guide tubes are limited by the materials being carried. A joint could conceivably provide rotational capability for the tube however the wire being carried must not be subject to excessive bending or torsion and the wire must be continuous to be driven from the source, through the guide tube, to point of use.

Rotary unions provide for rotational movement to fluid power systems, such as pneumatic and hydraulic systems. One limitation of rotary unions is that in a multitude they cross over one another, (as opposed to slip rings, which may be concentric). This often limits the use of rotary unions in fluid system reels to a single tube.

As automation and other systems become more complex there is an increasing need to provide cable reels that can accommodate a multitude of transmission systems and types, such as combinations of fluids, solid material, power, and high-speed data. It would therefore be desirable to provide a cable reel that deploys and stores, in a coiled fashion, cable, without excessive connectors, bends or torsional burdens.

SUMMARY

In an aspect of the present invention a cable reel is provided having an outer reel and a coaxially disposed inner drum. The reel rotates about a tubular axis fixed to mounting plates, which are in turn mountable upon any convenient structure such as a building, vehicle, or the like.

A length of cable is reeled about the outer spool and into the inner drum. There are a sufficient number of loops of cable in the inner drum to take up or assume the tensional slack created by rotation of the reel to uncoil the cable disposed on the outer spool. So, as the reel rotates to dispense or deploy the free end of the cable, the coils on the inner drum tighten around the tubular axis.

In this preferred embodiment the cable is comprised of an ethernet cable used to transmit data from a sensor at the free end, to computational, communications and electric generation devices at the fixed end. Also comprising the cable are three standard electric power wires used to power the sensor and generate the data of the ethernet cable. Specifically, the sensor is a multifunction camera that can be programmed to rotate, focus and digitize still and video data. It will be appreciated that any tool can be substituted for a camera, such as, without limitation, drill heads, welders, drive motors, weapons, robotic mechanisms, chemical sensors, cleaning devices, audio sensors, sonar arrays, weather sensors, smoke detectors, and the like. It will be appreciated that these tools or any combination thereof, can be accommodated and served by a variety of cable components.

Among potential cable components are ethernet, electric power, coaxial, fiber optic, any combination of data wire, pneumatic tubes, gas delivery tubes (such as in welding gas), fluid delivery (e.g. cleansers, fillers, adhesives), hydraulic tubes, material delivery (e.g wire for welding or soldering)

and the like. Any combination of these various, or other cables might be demanded by a tool or combination of tools as previously described.

The computational, communications and electric generation devices of the present embodiment might as well be any type of data processor, transmitter, fluid supply reservoir, fluid pump, power generator, battery, solar power array, or the like, or any combination thereof.

In the present embodiment camera data is collected and transmitted via the ethernet cable to a data processing station and storage device at the stationary side of the cable reel. Power is generated at the stationary side by a solar array, stored in a battery and transmitted, via power wires to the camera. The processed camera data may then be transmitted via cable, cellular, satellite or wi-fi means, to a remote processing station, perhaps hundreds or thousands of miles away.

In this preferred embodiment the camera is deployed on a mast to a vertically advantageous position above the ground. It will be appreciated that any tool may be deployed, by the present invention, into such as an earthen well, laterally on a boom into an unsuitable or dangerous environment, or into the sea. The height of the mast (in this case) determines the length of cable selected to be coiled on the outer spool. The radius of the spool and the length of the cable to be spooled determine the number of spool rotations required to fully deploy the cable. Consequently, that number of rotations is also used to calculate the number of loops to surround the fixed axial tube inside the inner drum.

In this preferred embodiment the ethernet cable and three electrical wires are bound together on the deployable end around the spool by a flexible metal conduit. The metal conduit may also continue on through a series of annuluses into and through the inner drum and exit the cable reel through a lumen of the axial tube. However, in the preferred embodiment, the metal conduit ends just inside the inner drum and a polymer conduit is employed for the rest of the length of the cable. It will be appreciated that any conduit or series of different conduit combinations might be used to bind all cable components into one elongate cable unit; that the conduit or conduit combination will be selected in accordance with the various physical combinations of the components, number of wraps, number of loops, various bend radii, etc.

Of course, standard ethernet connectors are contemplated to serve as connection points on both ends of the ethernet cable. As well, standard electrical connections serve to connect the electrical wires. Nevertheless, any connector, including solder joints are suitable, as these are not connections that need to be broken often. The connector for any cable component will be understood to be selected by one of ordinary skill in the art of that component.

The free end of the cable, in this embodiment, is fixed to the top of the mast. Therefore, cable is preferably deployed by the same means used to raise the mast. Retraction of the cable is accomplished by a clock spring advantageously disposed between the fixed axial tube and the spool and drum portions of the reel. In an embodiment wherein the tool is disposed vertically into an earthen hole, or the sea, gravity would provide the deployment force. In this event, a spring might not be enough retraction force and motor assisted retraction coiling might become necessary. If the tool is suspended on a boom, the cable end would be affixed and thereby deployed. Other means, such as a hand crank could be employed for this purpose. Retraction means would, accordingly, be selected suitable to any given purpose.

It is advantageous that a cable attached to the distal end of the mast (in the present embodiment, the mast is hollow) would be disposed within the mast. This provides a modicum of physical security and mechanical predictability.

In yet a second preferred embodiment, a robotic welding arm used in manufacturing assembly of metallic parts, is deployed roughly horizontally on a boom. At the work-end of the boom are welding contacts, a camera, and manipulative pneumatics; at the base are a processor, power sources, shielding gas, and a pneumatic pump. It will be appreciated that manipulation and use of the various sensors and tools will require a mixed-use cable to carry at least the following: 1. camera sensor data wire, 2. electric power for the welding head, 3. welding feed wire, 4. Pneumatic shield gas, and 5. electric power for the camera, servo drives and valves.

Further aspects of the cable reel apparatus are disclosed herein. The features as discussed above, as well as other features and advantages of the present disclosure will be appreciated and understood by those skilled in the art from the following detailed description and drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION OF THE PREFERRED EMBODIMENTS

Embodiments of the present disclosure now will be described more fully hereinafter with reference to the accompanying drawings. However, many different embodiments are contemplated, and the present disclosure should not be construed as limited to the embodiments set forth herein; rather, these embodiments are provided so that this disclosure will be thorough and complete and better convey the scope of the disclosure to those skilled in the art.

Figure 1:
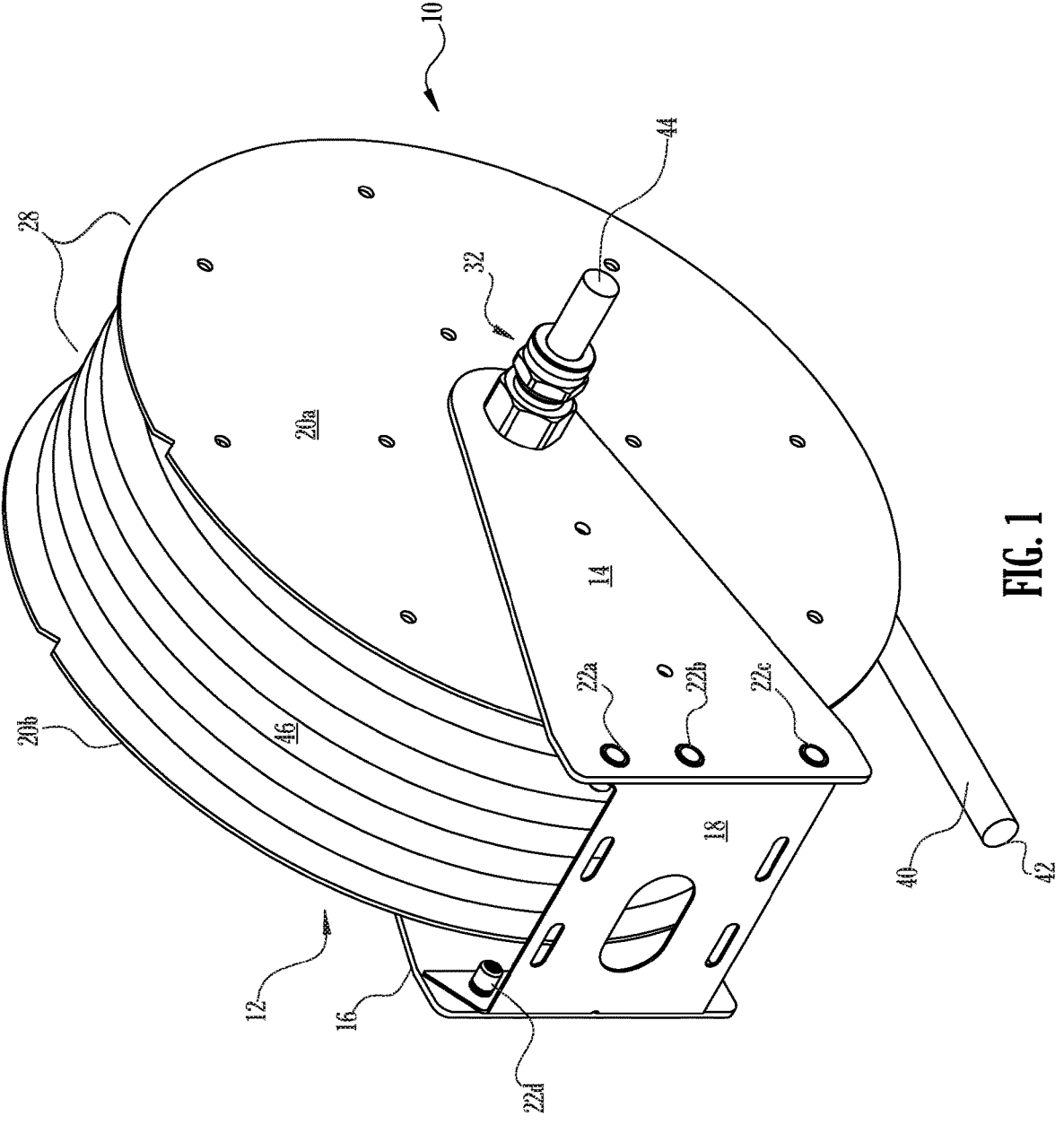
FIG. 1 is a perspective view of the cable reel of the present invention generally in a coiled configuration.
Figure 2:
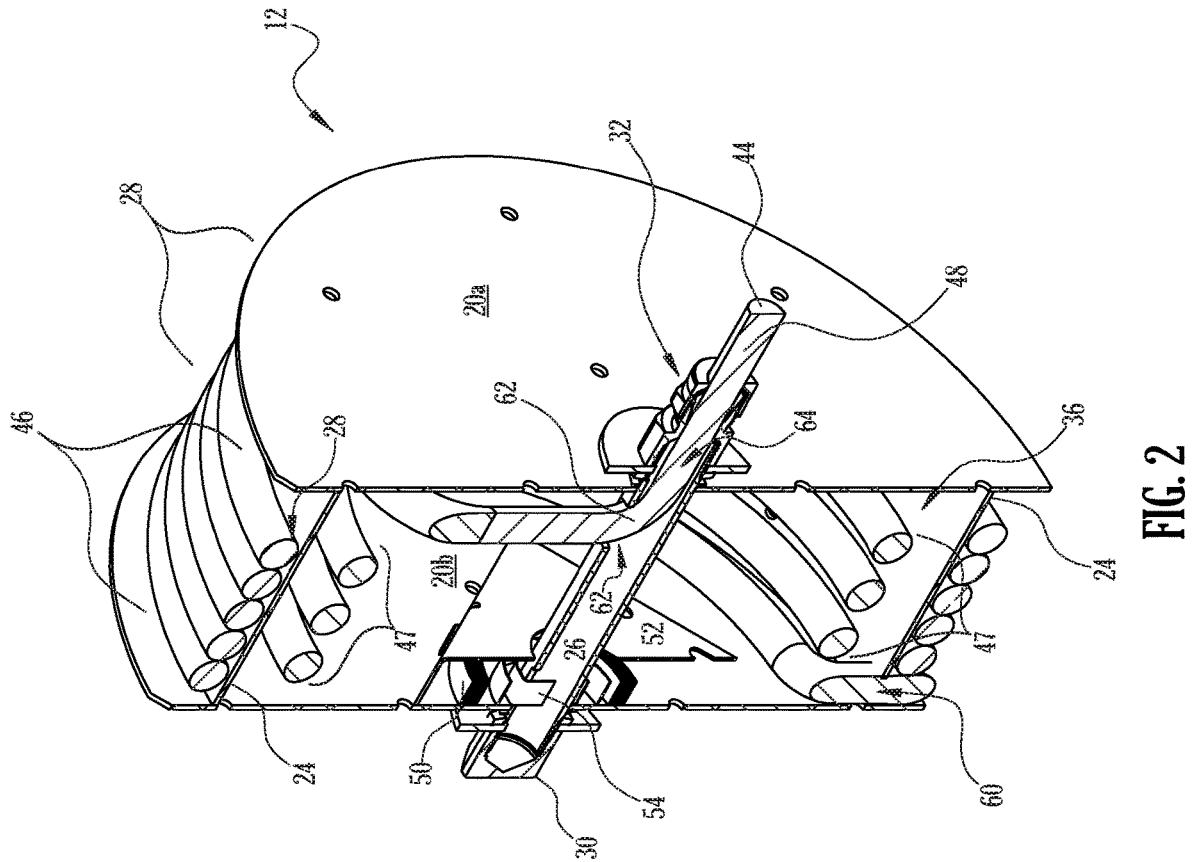
FIG. 2 is an axially bifurcated section perspective of the cable reel of FIG. 1.
Figure 3:
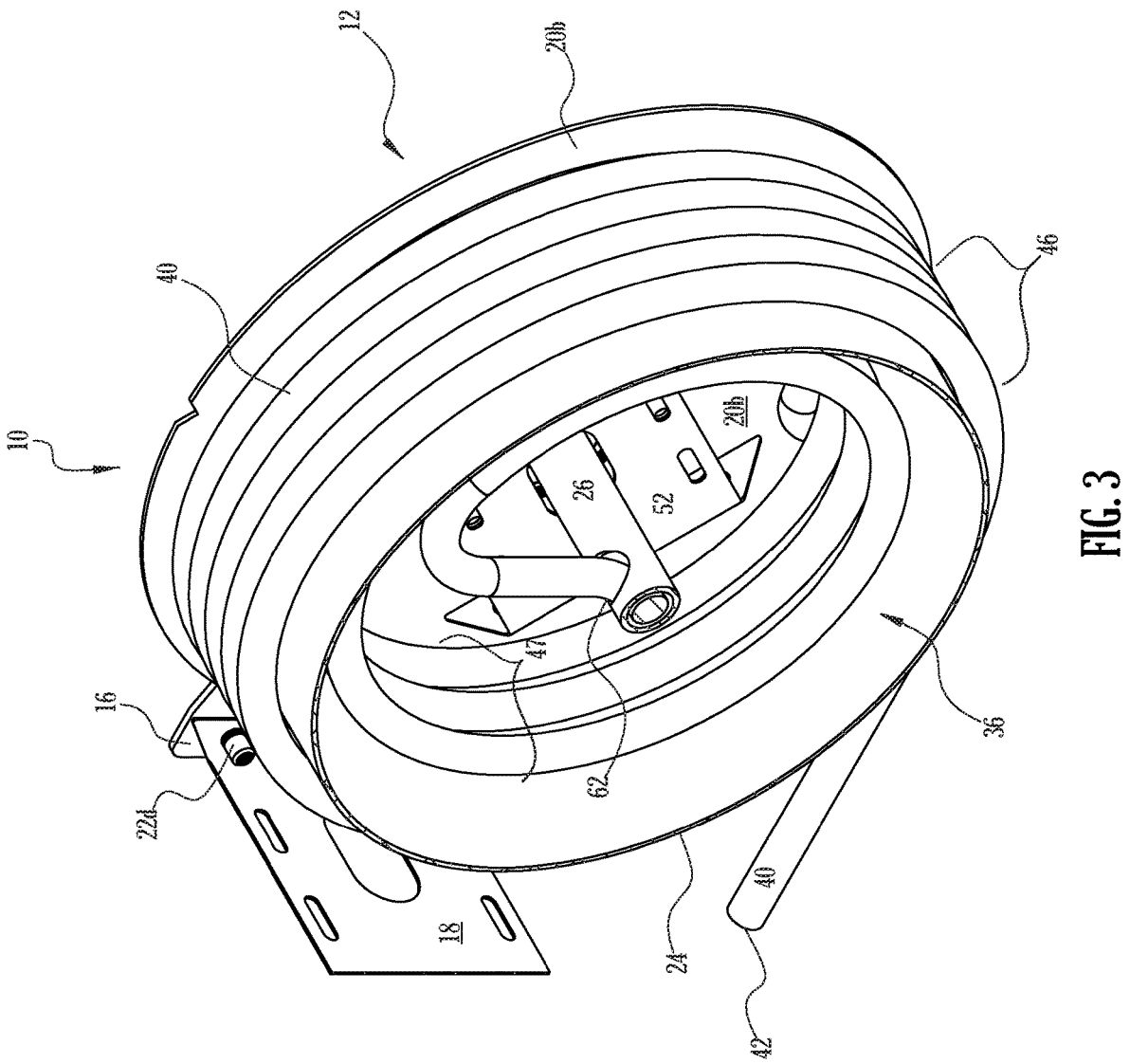
FIG. 3 is a perspective view of the cable reel of FIG. 1 having a sidewall removed and the cable generally coiled.
Figure 4:
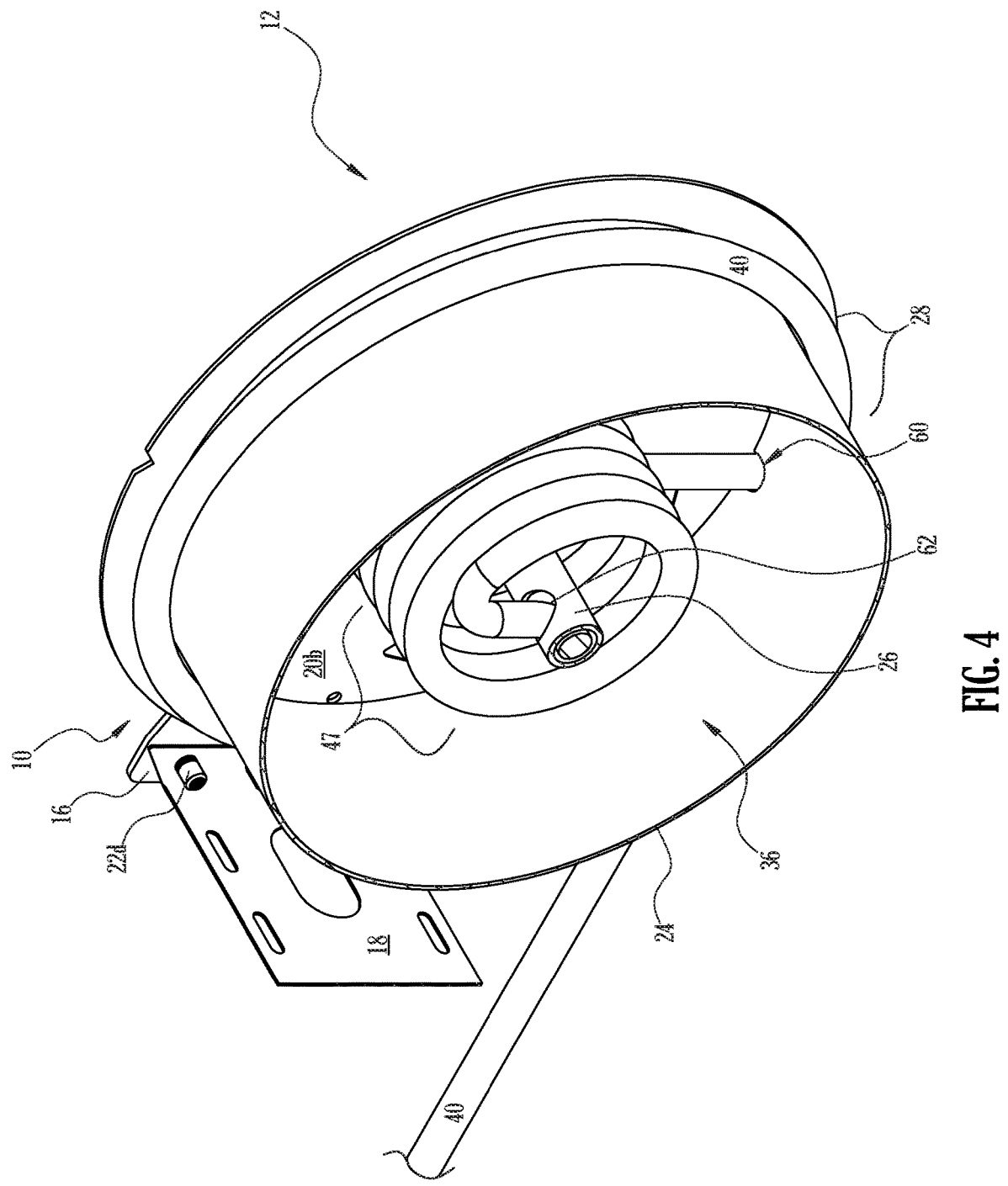
FIG. 4 is the view of FIG. 3, and the cable generally deployed.

Referring now to FIGS. 1, 2 & 3, wherein is depicted the cable reel 10 of this embodiment. Cable reel 10 is comprised of spool 12, first mounting bracket 14, second mounting bracket 16, and baseplate 18. Brackets 14 & 16 are affixed to the baseplate 18 by rivet nuts 22a-d (rivet nuts 22e-f, are hidden in this perspective). Spool 12 is laterally bracketed on its sides by sidewalls 20a-b. Radial partition 24 is disposed between sidewalls 20a and 20b, a distance from an axial tube 26 (FIGS. 2-4). Radial partition 24, in this embodiment, is affixed to the sidewalls 20a-b by welds (not depicted). But it will be appreciated that a variety of affixation means may be employed (without limitation, screws, bolts, rivets, etc.).

Sidewalls 20a-b extend radially beyond the partition 24 thereby forming an outer spool well 28. The depth of the outer spool well 28, is a function of the radii of the sidewalls 22a-b, and the distance of the radial partition from the axial tube 26. It will be appreciated that the depth of the outer well 28, is designed as a function of the nature of the material to be spooled (described hereafter) and the overall space needed to accommodate the cable reel 10.

Axial tube 26 (FIGS. 2-4) is affixed to first and second mounting brackets 14 & 16 such that it does not rotate in respect thereto. In this embodiment nut 30 (FIG. 2) affixes to one side of the axial tube and compression nut 32 (FIGS. 1&2) affixes to the other side. This arrangement causes the axial tube 26, first mounting bracket 14, second mounting bracket 16 and baseplate 18 to be affixed together to form a mounting system for the reel. It will be appreciated that the mounting system will further be affixed to some other structure (building, cart, vehicle, etc. not depicted) such that the reel remains stationary. It will be appreciated that keyway means (not depicted) might be used to prevent rotation of axial tube 26 with respect to the mounting system, but in our experience it has not been necessary. Axial tube 26, is a typical steel pipe, in this instance. Axial tube 26, is sufficiently wear resistant such that rotation of the sidewalls 20a-b thereupon will not damage it. In an application with combinations of high loads and high cycle life requirement bushings or bearings could be utilized.

The inner surface (proximal to axial tube 26) of radial partition 24, sidewalls 20a-b, and outer surface of the axial tube 26, define an inner drum 36 (FIGS. 2-4).

Sidewalls 20a-b rest on the outer surface of the axial tube 26, in an axis-rotatable fashion.

A cable 40, is described herein having a first end 42 (FIGS. 1&3) and a second end 44. Cable 40 is homogenous from end 42 through end 44, except as described herein sheath 40, may terminate or change in substance.

Also provided is a bias clock spring 50 and a spring housing 52 (FIGS. 2&3). The spring housing is attached to the inner wall of a sidewall 20b by way of welds, studs or rivets (not depicted). Clock spring 50 resides over the axial tube 26 in a radial manner having an inner tab 54 (FIG. 2), affixed to the axial tube 26 and an outer tab (not depicted) affixed to the spool 12, such that when spool 12 rotates with respect to the tube 26, the spring 50 is wound and biases the spool 12 to a wound position. It will be appreciated that a variety of springs, motors or hand-cranks could be employed to accomplish the rotation described.

Now, turning to the dynamic relationship of cable 40 with respect to cable reel 10. Cable 40 has three longitudinal segments: an outer segment 46, an inner segment 47 (FIGS. 2-4) and an axial segment 48 (FIG. 2). The outer cable segment 46, is disposed about the outer spool well 28 when there is no demand for extended cable, such as when a tool (not depicted) is in a stored and unused condition. However, when there is a demand for extended cable 40, the reel 12 unwinds and cable is deployed from outer segment 46. In this condition the clock spring 50 tightens and creates a stored bias to rewind cable segment 46 when the demand is no longer needed.

Cable 40 travels through the radial partition 24 at a partition annulus 60 (FIGS. 2&4) therethrough. Several coil winds are placed on the inner cable segment 47 around the axial tube 26. These coils roughly correspond to the number of winds of the outer coil segment 46 on the outer spool well 28.

From the inner drum well 36, cable 40 then travels through an internal annulus 62 of the axial tube 26, through the lumen of the axial tube 26 and exits through a second axial annulus 64, thereby forming the axial cable segment 48. The second cable end 44 of the axial cable segment 46, is fixed in axial position by compression nut 32.

The condition of the inner cable segment 47 has hereto been described when cable is not deployed, i.e. the inner cable segment 47 is relaxed adjacent the inner wall of radial partition 24 (the outer wall of the inner spool well 36). See, FIGS. 1-3.

It will be appreciated that the coils of the inner cable segment 47 might be used in lieu of clock spring 50, to bias the cable reel 10 in a condition in which cable 40 is coiled upon spool 12. This would necessarily depend on selecting cable components that have a natural bias. The components of the cable will be chosen for function. However, design of sheath 74 (FIG. 5) will be made to accommodate this bias function in terms of composition and construction. For example, wall composition and thickness can be selected to yield the desired bias.

FIG. 4 depicts cable 40 deployed from spool 12 and the inner coil segment 47, consequently, tensionally assumed radially proximal to axial tube 26. That is to say; when spool 12 rotates to deploy outer cable segment 46, that rotation tensionally tightens coils of the inner cable segment.

In particular, when Cable 40 is coiled upon the outer spool well 28, it has five stored rotations (FIG. 3). When cable 40 is fully deployed (FIG. 4) it has one coil in retention. The diameter of the radial partition 24 (the base of well 28) is twelve and ¾ inches. Therefore, the length of cable deployed is just greater than one hundred sixty inches. The number of cable 40 loops in the drum 36 are three in coiled condition (FIG. 3). These three loops each have a nominal diameter of eight and ½ inches (FIG. 3). When cable 40 is deployed (FIG. 4), the rotation necessary to accomplish that causes the coils to tensionally assume the rotation, changing the number of loops in the inner cable segment 47 of the drum 36 to seven, having a nominal diameter of just greater than three and ½ inches.

Figure 5:
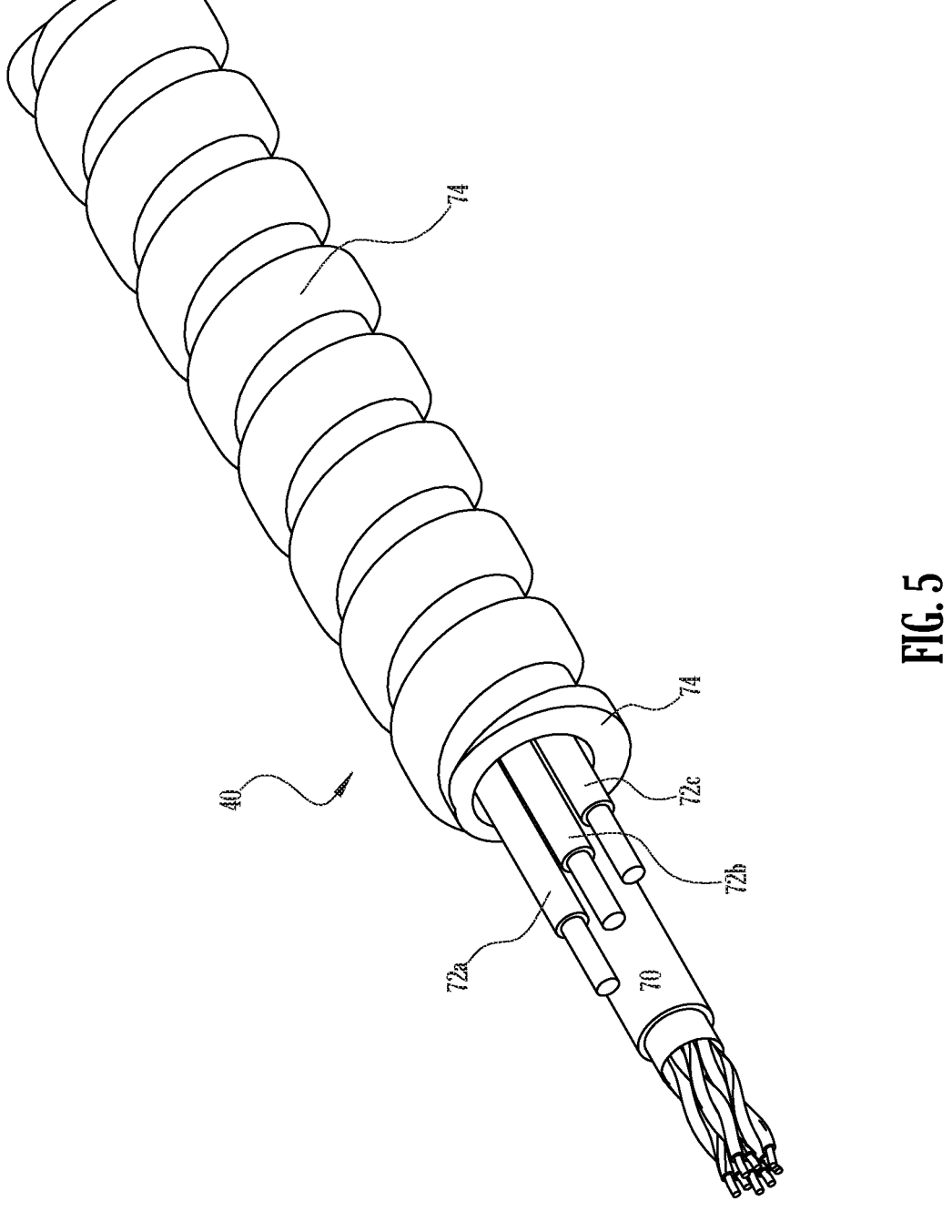
FIG. 5 is a perspective cutaway view of the cable of FIGS. 1-4.

FIG. 5 depicts cable 40, of FIGS. 1-4, generally broken out at second end 44. A category 5E ethernet cable is depicted 70. Power wires include DC Pos. 72a, DC Neg. 72b, and ground wire 72c. ethernet cable 70 carries data between the camera (not depicted) and a processor (not depicted). Power wires 72a-c are used to power the camera and whatever else may be employed at the tool end 42 of cable 40. Ethernet cable will be appreciated by one skilled in the art to be shielded and composed of stranded conductors to allow for continuous flexing. Power wires 72a-c are 16 AWG wire that consists of stranded conductors for continuous flexing.

A flexible cable conduit sheath 74 is disposed around the various cable components (ethernet cable 70 & power wires 72a-c) to encase and unify them. Sheath 74 in this preferred embodiment is a rolled flexible metal conduit, in other embodiments it may be desirable to encase the rolled metal in a flexible polymer to make it watertight. The sheath could also be a woven flexible polymer or other material. It will be appreciated that when sub-components of cable 40 (ethernet cable 70 & power wires 72a-c) are bound by sheath 74, the widely differing physical characteristics of the components formulate a cable 40 that acts in predictable ways. In particular, the loops of inner cable segment 47 as it resides in inner drum well 36 around axial tube 26, tightens and loosens in a far more predictable manner than would unsheathed components of the same cable.

It will further be appreciated that sheath 74 will guard cable components (ethernet cable 70 & power wires 72*a-c*) against abrasion and slippage as they travel through and bias against the partition annulus 60, internal annulus 62 and second axial annulus 64.

When the term "composite cable" as used herein, it is intended to mean a mixed-use cable bundled within a flexible conduit sheath. Mixed use means some combination of data wire, fiber optic waveguide, power wire, gas tube, liquid tube, and solid conveyance tube.

As used herein "torsion sensitive" means any elongate component which cannot withstand repeated tortious rotation. Fiber optic waveguides, as discussed elsewhere herein, are inherently sensitive. Insulation sheaths are subject to cracking under torsion and, thus separation and possible shorting. The sensitive conductors used for data can be inherently subject to these failure modes.

Figure 6:
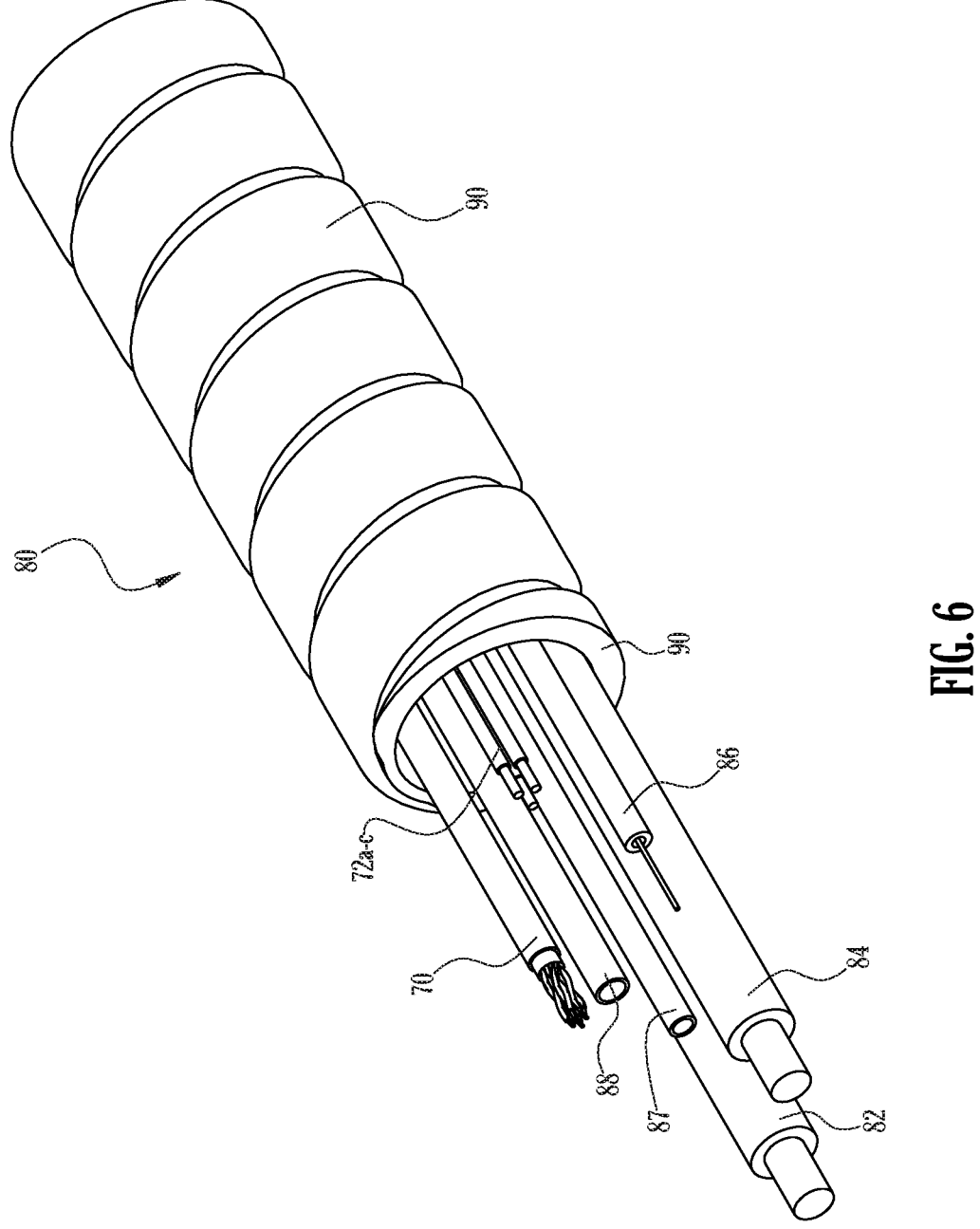
FIG. 6 is a perspective cutaway view of the cable of a second preferred embodiment.

FIG. 6 illustrates a second preferred embodiment of cable reel 10 configured to operate and supply the welding head of a robotic arm (not depicted). Cable 80 is operative in the same manner upon the reel, 12, as in the first preferred embodiment illustrated in FIGS. 1-5, except that cable 80 is of somewhat different composition as will be described.

Cable 80 has the following components throughout its length: ethernet cable 70, power wires 72*a-c*, welding arc sub-cable 82, welding ground sub-cable 84, welding feed wire and tube 86, shield gas tube 87, pneumatic tube 88, and large cable conduit 90. ethernet cable 70 and power wires 72*a-c* are of the same composition and of similar purpose as previously described.

Welding sub-cables 82 & 84 are of a sufficiently large gauge to handle the current necessary to effect arcs and temperatures for welding; but, small enough to minimize the overall structure cable 80 and reel 10. The gauge of sub-cables 82 & 84 is, of course, a function of the length of the wire, the duty cycle of the welding unit and the nature of the substance being welded. Nevertheless, 2 AWG braided, extra flexible copper wire is generally considered sufficient in this application.

Welding filler is provided via welding feed wire and tube 86. Feed wire tube 86, is an example of "solid conveyance tube" as previously discussed. In this instance the feed wire is 0.030" solid-core wire. The outer tube guide of wire and tube 86, is 0.035 inch I.D. PVC sheath. Shield gas tube 87 delivers pressurized shield gas in accordance with good welding technique, often argon or a $CO_2$/argon mix, depending on the application. Gas tube 87 is a ¼ inch I.D. styrene-butadiene rubber hose.

Lastly, pneumatic tube 88 provides pressurized gas to drive single-acting pneumatic rams (not depicted) to operate a pneumatic gripper used to manipulate workpieces. The tube 88 is one quarter inch polyurethane tubing, and its use and composition are well known. It will be appreciated that the pneumatic gripper and other attendant apparatus (valves, etc.) will be selected and disposed in accordance with one of ordinary skills in those arts.

Lastly, large cable conduit sheath 90, is of a one and ½ inch in diameter and of ten inch bend radius to accommodate the previously described structure, It is of similar composition and configuration as cable conduit sheath 74, FIGS. 1-6, but larger.

From the foregoing, it will be appreciated that the above disclosed apparatus enables a cable reel that accommodates deployment of and service to a variety of tools remote from service components such as tubes, wires and wave guides and eliminates the need for unorganized slack and excessive connectors, bends, and torsional flex.

Although certain example apparatus and methods, and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A cable reel comprising: an outer spool and inner drum, a longitudinally contiguous torsion-sensitive cable comprising a fixed end and a deployable end, sidewalls, and a fixed axial tube about which the sidewalls, inner drum and outer spool are rotatably attached, said outer spool and inner drum being bracketed by the sidewalls, a partition radially disposed about the axis of the tube between the sidewalls forming a radial base for the outer spool and a radial roof for the inner drum, the length of cable coilable about the outer spool, communicating with the inner drum through an annulus in the partition, looping about the axial tube, extending through an annulus in the tube and exiting axially through a second annulus, being fixed within the second annulus of the tube, the loops of the inner drum being of a fixed length and of sufficient number to tensionally assume the rotation of the reel when the length of outer cable is deployed, and to relax when the outer cable is coiled.

2. The apparatus of claim 1, wherein the cable further comprises a fiber optic waveguide.

3. The apparatus of claim 1, wherein the cable further comprises a fluid tube.

4. The apparatus of claim 1, wherein the cable comprises at least one electrically conductive wire and one tube.

5. The apparatus of claim 1, wherein the cable further comprises a plurality of individually sheathed conductors bundled in a unified outer sheath.

6. The apparatus of claim 5, wherein the cable comprises an ethernet cable and a plurality of electrical power wires, the outer sheath further comprising a metal flex conduit.

* * * * *